United States Patent Office 3,419,605
Patented Dec. 31, 1968

3,419,605
METHOD OF PREPARING KETO-MONOCARBOXYLIC ACIDS
Theodore C. Mead, Glenham, N.Y., assignor to Texaco Inc., New York, N.Y., a corporation of Delaware
No Drawing. Filed Sept. 21, 1964, Ser. No. 398,090
5 Claims. (Cl. 260—514)

ABSTRACT OF THE DISCLOSURE

A method of preparing keto-monocarboxylic acids via oxidizing alpha-hydrocarbon cyclohexanones in the presence of an alkali metal hydroxide or alkaline earth metal hydroxide in the presence of inert aqueous reaction solvent, then removing said solvent, acidifying the reaction mixture and recovering the keto acid which is useful in the preparation of keto acid esters of alkanols, and amides and N-substituted amides of the keto acids, the latter being useful as a detergent dispersant additive in lubricating oil.

---

This invention pertains to a method of preparing keto-acids from cycloalkanones. More particularly, it is directed to a process of preparing keto-monocarboxylic acids via catalytically oxidizing alpha-hydrocarbon substituted cyclohexanones.

The keto-carboxylic acids prepared by the method of the invention are useful as starting reactants in the preparation of the keto-acid esters of alkanols, and amides and N-substituted amides of the keto-acid. These keto-acid ester, amide, and substituted amide derivatives are useful as detergent-dispersant additives for lubricating oils particularly when in combination aromatic sulfonates.

In the past, the keto-acids contemplated herein have been prepared in relatively low yields by heating under vigorous oxidizing conditions alpha-alkylcycloalkanone in the presence of the relatively expensive and severe oxidizing agent combination of chromic oxide and sulfuric acid.

I have discovered and this constitutes my invention a method of preparing a keto-acid of the general formula:

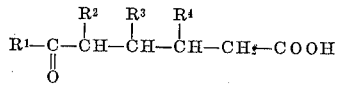

where $R^1$ is a hydrocarbon radical selected from the group consisting of alkyl, cycloalkyl, aryl, alkaryl and aralkyl of from 1 to 20 carbons and $R^2$, $R^3$ and $R^4$ are members selected from the group consisting of hydrogen, alkyl, cycloalkyl, aryl, alkaryl, and aralkyl of from 1 to 20 carbons and at least two of said $R^2$, $R^3$ and $R^4$ members being hydrogen, utilizing a relatively inexpensive catalyst under mild oxidizing conditions to obtain heretofore unattainable yields of keto-monocarboxylic acid. More particularly, I have discovered that when a cyclohexanone of the general formula:

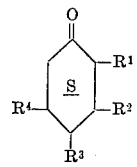

where $R^1$, $R^2$, $R^3$ and $R^4$ are as heretofore defined, is contacted with an oxygen containing gas in the presence of an alkali or alkaline earth metal hydroxide catalyst-inert aqueous reaction solvent combination, it can be converted into the keto-carboxylic product in relatively high yields under moderate condtions.

In the actual operation of the method of the invention an oxygen containing gas is passed into a reaction solution containing a mixture of the cyclohexanone reactant, metal hydroxide and inert aqueous reaction solvent while desirably maintaining the reaction solution at a temperature between about 20 and 50° C., preferably between about 25 and 35° C. Under advantageous conditions, the mole ratio of metal hydroxide to cyclohexanone reactant employed is between about 1.4:1 and 0.9:1 and the aqueous solvent constitutes between about 50 and 80 wt. percent of the reaction mixture with the solvent content of the aqueous solvent ranging between about 50 and 90 volume percent. The oxygen blowing is normally continued for a period of between about 4 and 10 hours at a rate of between about 100 and 200 liters oxygen/liter reaction mixture/hour, whereupon a metal salt of the desired keto-acid is recovered from the reaction mixture. The metal portion of the salt is derived from the catalyst. The keto-acid salt is acidified to convert it into the corresponding keto-acid product. The latter two steps, i.e., the recovery of the keto-acid salt and acidification are accomplished by standard means. One such means is the solvent is first removed via distillation and the residual reaction mixture is diluted with water to form a diluted residual reaction mixture containing between about 40 and 85 vol. percent water. After diluting the reaction mixture is subjected to extraction with an inert extraction solvent which selectively removes the non-salt organic compound such as any unreacted cycloalkanone reactant, and the resultant aqueous and extractive solvent layers are separated from one another. The aqueous layer which contains the keto-acid salt is acidified, e.g., with a mineral acid to a pH below about 5 and the resultant generated keto-acid in the acidified aqueous solution is removed therefrom utilizing an inert solvent which selectively extracts the formed keto-acid. The aqueous layer is discarded, and the solvent layer containing the keto-acid is subjected to fractional distillation to isolate the keto-acid product. To promote the extraction of the keto-acid from the acidified final reaction mixture a salting out technique may be also employed by adding an inert inorganic acid salt such as sodium chloride or ammonium sulfonate in amounts to saturate the aqueous acidified final reaction mixture.

The method of the invention is further described by the following equations utilizing sodium hydroxide as catalyst and aqueous ethanol as solvent:

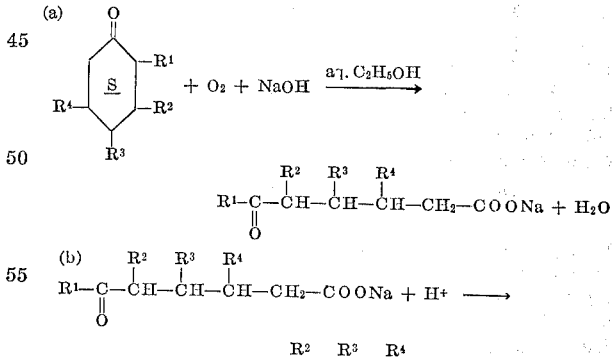

where $R^1$, $R^2$, $R^3$ and $R^4$ are as heretofore defined.

In the foregoing procedure specific examples of the cyclic ketone reactants contemplated herein are 2-methylcyclohexanone, 2-isopropyl-3-methylcyclohexanone, 2-phenylcyclohexanone, 2-(p-tolyl)cyclohexanone, 2-benzylcyclohexanone, 2-butyl-4-phenylcyclohexanone, 2-butyl-5-benzylcyclohexanone, 2-phenyl-5-(p-tolyl)cyclohexanone, and 2-cyclohexylhexanone. Specific corresponding examples of the keto-acid products contemplated herein are 6-oxoheptanoic acid; 5,7-dimethyl-6-oxooctanoic acid; 6-phenyl-6-oxohexanoic acid; 6-(p-tolyl)-6-oxohexanoic acid; 7-phenyl-6-oxoheptanoic acid; 4-phenyl-6-oxodecanoic acid; 3-benzyl-6-oxodecanoic acid; 3-(p-tolyl)-6-phenyl-6-oxohexanoic acid and 6-cyclohexyl-6-oxohexanoic acid.

The criteria for the aqueous reaction solvent is that it be inert and solubilize both the metal hydroxide catalyst and ketone reactant to form a homogeneous reaction solution. Also the non-aqueous portion of the aqueous solvent should be water miscible. Specific examples of the non-aqueous portion of the inert aqueous reaction solvent contemplated herein are the water miscible liquid alkanols such as methanol, ethanol, n-propanol, and isopropanol.

Examples of the catalytic alkali metal and alkaline earth metal hydroxides contemplated are sodium hydroxide, potassium hydroxide, lithium hydroxide, barium hydroxide and calcium hydroxide.

The oxygen containing gas may be air, pure oxygen or oxygen diluted with an inert gas such as nitrogen.

Particular extraction solvents that may be employed for removal of the non-salt organic compounds and keto-acid product are any of the inert liquid hydrocarbons such as xylene, benzene, toluene and isooctane.

Examples of suitable acidifying acids can be any of the mineral acids such as hydrochloric acid and sulfuric acid.

The following examples further describe the invention but are not to be construed as limitations thereof.

Example I

This example illustrates the method of the invention.

To a 3-necked round bottomed two-liter flask fitted with a thermometer, water cooled condenser, fritted gas bubbler and magnetic stirrer together with ice water and Dry Ice-acetone traps attached after the condenser, there were added 200 grams of 2-methylcyclohexanone dissolved in 900 mls. of 85% aqueous ethanol and 68 grams of sodium hydroxide. Oxygen was metered through the solution at a rate of 2.4 liters/minute and stirring was maintained. The oxygen addition was continued for 7 hours and the reaction temperature was maintained at 30° C. by means of periodic use of an ice bath. At the end of the reaction period the ethanol was removed under 20 mm. Hg pressure. To the distillation residue there was added 500 mls. of water. The resultant two phase system was extracted with 450 mls. of benzene in 5 portions. The residual aqueous layer was acidified with 53 mls. of concentrated hydrochloric acid to a pH of about 5 and was saturated with 200 grams of ammonium sulfate. The acidified-saturated aqueous layer was extracted for 64 hours with 750 mls. of benzene in a continuous liquid-liquid extractor. Fractional distillation of the resultant benzene extractant solution yielded 49.1 grams of 6-oxoheptanoic acid of the formula:

$$CH_3-C-CH_2-CH_2-CH_2-CH_2-COOH$$
$$\parallel$$
$$O$$

having a boiling point of 112–120° C. at 1 mm. Hg which crystallized on standing to a waxy solid of a melting point of 31–33° C. Literature values for 6-oxoheptanoic acid give a boiling point of 122–125° C. at 1 mm. Hg and a melting point of 34–35° C. The mole percent yield of 6-oxoheptanoic acid on the basis of unreacted (i.e., unrecovered) ketone was 43.

Example II

This example further illustrates the method of the invention. The overall procedure employed was as follows:

To a 3 necked round-bottomed flask of a size about twice the volume of the reaction mixture fitted with a thermometer, water cooled condenser, fritted gas bubbler and ice water and Dry Ice-acetone traps placed after the condenser, there was added 2-methylcyclohexanone, sodium hydroxide and aqueous ethanol. The solutions were magnetically stirred while oxygen was bubbled therethrough. During oxygen contact the reaction temperature was maintained at between 30 and 35° C. employing ice bath cooling. At the end of the reaction period ethanol was distilled off under about 20 mm. Hg pressure. The initial reaction mixture was diluted with between 200 and 400 mls. water and contacted with between 300 and 600 mls. benzene under agitation conditions. After agitation the resultant benzene and aqueous layers were separated from one another. The separated aqueous layer was acidified to a pH of about 5 with between 45 and 55 mls. of concentrated hydrochloric acid, saturated with between 100 and 300 grams ammonium sulfate and continuously extracted with between about 500 and 1000 mls. of benzene for at least 12 hours. The benzene was stripped from the recovered benzene extraction layer by distillation at atmospheric pressure. The residue was fractionally distilled and the oily liquid recovered at between about 110 and 125° C. at 1 mm. Hg and crystallized on standing to a waxy solid having a melting point between about 30 and 35° C. The waxy solid product was identified as 6-oxoheptanoic acid. In Table I below the specific reaction conditions, ingredient amounts and results for specific runs using the foregoing general procedure are reported:

TABLE I.—REACTANTS

| Run | Ketone Reactant, g. | NaOH, g. | Mole Ratio NaOH/Ketone | Aqueous Solvent, Percent EtOH | Vol. Solvent, Mls. |
|---|---|---|---|---|---|
| A[1] | 39.2 | 20 | 1.4 | 65 | 135 |
| B | 100 | 40 | 1.1 | 85 | 450 |
| C | 200 | 68 | 0.95 | 85 | 900 |
| D | 400 | 136 | 0.95 | 85 | 1,800 |
| E | 200 | 68 | 0.95 | 85 | 900 |

REACTION CONDITIONS

| Run | O₂ Rate, liters/minute | Reaction Time, hrs. |
|---|---|---|
| A[1] | 2.4 | 5 |
| B | 2.4 | 20.3 |
| C | 2.4 | 6 |
| D | 2.4 | 105 |
| E | [2] | 144 |

PRODUCT YIELD

| Run | 6-oxoheptanoic acid, g. | Mole Percent Yield |
|---|---|---|
| A[1] | 24.5 | [3] 65 |
| B | 50.0 | 44 |
| C | 48.5 | 42 |
| D | 90.5 | 37.4 |
| E | 102 | 57 |

[1] The continuous extraction step was omitted and the acidified solution simply extracted with four 50 cc. portions of benzene.
[2] In Run E, the reaction mixture was stirred under a slight (1.5 atmos.) positive pressure of oxygen in a closed system.
[3] Based on crude 6-oxoheptanoic acid.

Example III

This example also illustrates the method of the invention.

The procedure of Example I was essentially repeated except that 180 grams of 2-cyclohexylhexanone were substituted for the 2-methylcyclohexanone. Further, 50 grams of sodium hydroxide, 500 mls. of 85% aqueous ethanol and a reaction temperature of 37° C. were employed utilizing a reaction time of 7 hours. In a yield of 27 mole percent, 6-cyclohexyl-6-oxohexanoic acid of the formula:

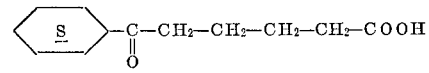

was obtained.

Example IV

This example also illustrates the method of the invention:

The procedure of Example I was essentially repeated except 97 grams of methanone(2-isopropyl-5-methylcyclohexanone) were substituted for the methylcyclohexanone and 26 grams of sodium hydroxide, 450 mls. of 85% aqueous ethanol were employed at 30° C. utilizing a reaction time of 90.5 hours. In a 47 mole percent yield, menthonoic acid (3,7-dimethyl-6-oxooctanoic acid) of the formula:

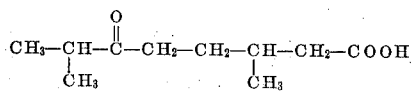

was obtained.

Example V

This example illustrates the criticality or preferability of the recited ketone reactant, metal hydroxide catalyst solvent combination, temperature and solvent quantities.

The overall procedure of Example I was generally followed and the test data and results are reported below in Table II:

TABLE II.—REACTION MIXTURE

| Run | Ketone [1] Reactant | Wt. Ketone, g. | Catalyst | Wt. Cat., g. | Aqueous Solvent (Wt. Percent) | Vol. aq. Solvent, mls. |
|---|---|---|---|---|---|---|
| F | 2-MCH | 50 | KF | 10 | 100% Benzene | 200 |
| G | 2-MCH | 200 | Na$_2$CO$_3$ | 180 | 85% EtOH | 1,200 |
| H | CP | 42 | NaOH | 24 | 85% MeOH | 80 |
| I | CP | 42 | NaOH | 21 | 50% MeOH | 176 |
| J | CH | 175 | NaOH | 68 | 85% EtOH | 900 |
| K | 2-MCH | 200 | NaOH | 68 | 85% EtOH | 2,500 |
| L [2] | 2-MCH | 200 | NaOH | 68 | 85% EtOH | 900 |
| M | 2-MCH | 200 | NaOH | 68 | 85% EtOH | 900 |
| N | 2-MCH | 200 | NaOH | 143 | 85% EtOH | 900 |

REACTION CONDITIONS AND KETO-ACID YIELD

| Run | Reaction Temp., °C. | Reaction Time, Hrs. | Yield [3] Mole Percent |
|---|---|---|---|
| F | 70 | 6 | 0 |
| G | 30 | 4 | 0 |
| H | 64 | 3.5 | 0 |
| I | 0 | 3 | 0 |
| J | 30 | 8 | 0 |
| K | 30 | 22 | 8 |
| L [2] | 30 | 8 | 17 |
| M | 0 | 8 | 13 |
| N | 30 | 6.8 | 21 |

[1] 2MCH=2-methylcyclohexanone; CP=cyclopentanone; CH=cyclohexanone.
[2] Acidification with HCl took place prior to ethanol removal.
[3] 6-oxoheptanoic acid.

In the above table, Runs F and G demonstrate that the use of metal hydroxide catalyst and aqueous reaction solvent as defined are essential to the method of the invention under the prescribed conditions since in these runs using catalyst and solvent other than as defined, no keto-acid was produced. In addition, Runs H, I and J show that an alpha substituted cycloalkanone reactant as defined must be employed to form the keto-acid in the method of the invention. The low yield of keto-acid in Run K demonstrates the desirability of maintaining the aqueous solvent content below 80 wt. percent in the reaction mixture. The low yield of keto-acid in Run L demonstrates the advantages of the step of removing reaction solvent prior to acidifying the residual reaction mixture. The poor yield of Run M shows the desirability of operating the reaction temperature above about 20° C. and the reduced yield of Run N shows the preferability of maintaining the mole ratio of metal hydroxide to ketone reactant below about 1.4:1.

I claim:

1. A method of preparing a keto-acid of the formula:

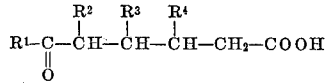

wherein $R^1$ is a hydrocarbon radical selected from the group consisting of alkyl, cycloalkyl, aryl, alkaryl and aralkyl of from 1 to 20 carbons and $R^2$, $R^3$ and $R^4$ are members selected from the group consisting of hydrogen and alkyl, cycloalkyl, aryl, alkaryl, and aralkyl of from 1 to 20 carbons, said alkyl, cycloalkyl, aryl, alkaryl and aralkyl in the members group consisting solely of carbon and hydrogen, and where at least two of said members are hydrogen comprising contacting a cyclohexanone of the formula

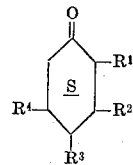

where $R^1$, $R^2$, $R^3$ and $R^4$ are as heretofore defined, with oxygen in the presence of an inert aqueous reaction solvent and a metal hydroxide as the sole inorganic metal containing initial ingredient in said method selected from the group consisting of alkali metal hydroxide and alkaline earth metal hydroxide, separating said solvent from the reaction mixture, acidifying the solvent free reaction mixture and recovering said keto-acid from the acidified solvent free reaction mixture.

2. A method of preparing a keto-acid of the formula:

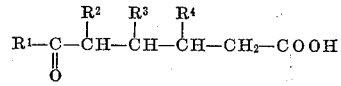

where $R^1$ is a hydrocarbon radical selected from the group consisting of alkyl, cycloalkyl, aryl, alkaryl and aralkyl and $R^2$, $R^3$ and $R^4$ are members selected from the group consisting of hydrogen and alkyl, cycloalkyl, aryl, alkaryl and aralkyl of from 1 to 20 carbons, said alkyl, cycloalkyl, aryl, alkaryl and aralkyl in said members group consisting solely of carbon and hydrogen, where at least two of said members are hydrogen comprising contacting a cyclohexanone of the formula:

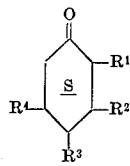

where $R^1$, $R^2$, $R^3$ and $R^4$ are as heretofore defined, with an oxygen containing gas in the presence of aqueous, water miscible liquid alkanol solvent and a metal hydroxide as the sole inorganic metal containing ingredient in the initial reaction mixture selected from the group consisting of alkali metal hydroxide and alkaline earth metal hydroxide at a temperature between about 20 and 50° C. in a mole ratio of said metal hydroxide to said cyclohexanone of between about 1.4:1 and 0.9:1, subsequently removing said solvent from the reaction mixture, diluting the solvent free residue with water, contacting the diluted residue with an inert liquid solvent selective for totally organic substances only, separating the resultant aqueous phase, acidifying the recovered aqueous phase with a mineral acid, and recovering said keto-acid from the acidified aqueous phase, said aqueous alkanol comprising between about 50 and 80 wt. percent of the said cyclohexanone, metal hydroxide, aqueous alkanol initial reaction mixture.

3. A method in accordance with claim 2, wherein said keto-acid is 6-oxoheptanoic acid, said cyclohexanone is 2-methylcyclohexanone, said metal hydroxide is sodium hydroxide, said mineral acid is hydrochloric acid, said alkanol solvent is ethanol, and said inert liquid solvent is benzene.

4. A method in accordance with claim 2 wherein said keto-acid is menthonoic acid, said cyclohexanone is 2-isopropyl-5-methylcyclohexanone, said metal hydroxide is sodium hydroxide, said acidifying acid is hydrochloric acid, said alkanol solvent is ethanol and said inert liquid solvent is benzene.

5. A method in accordance with claim 2 wherein said keto-acid is 6-cyclohexyl-6-oxohexanoic acid, said cycloalkanone is 2-cyclohexylhexanone, said metal hydroxide is sodium hydroxide, said acidifying acid is hydrochloric acid, said alkanol solvent is ethanol and said inert liquid solvent is benzene.

References Cited

UNITED STATES PATENTS 2,316,543  4/1943  Amend _____ 260—514

LORRAINE A. WEINBERGER, *Primary Examiner.*

P. KILLOS, *Assistant Examiner.*

U.S. Cl. X.R.

260—523, 526